United States Patent
Besutti et al.

(10) Patent No.: US 9,329,575 B2
(45) Date of Patent: May 3, 2016

(54) BEARING INCLUDING FIRST AND SECOND FUNCTIONAL ELEMENTS ON TWO DISTINCT FACES

(71) Applicant: Comadur S.A., Le Locle (CH)

(72) Inventors: Bruno Besutti, Charquemont (CH); Marie-Claire Barata, Villers-le-Lac (CH); Christian Russi, Le Locle (CH)

(73) Assignee: Comadur S.A., Le Locle (CH)

( * ) Notice: Subject to any disclaimer, the term of this patent is extended or adjusted under 35 U.S.C. 154(b) by 0 days.

(21) Appl. No.: 14/196,306

(22) Filed: Mar. 4, 2014

(65) Prior Publication Data

US 2014/0254332 A1   Sep. 11, 2014

(30) Foreign Application Priority Data

Mar. 11, 2013   (EP) ..................................... 13158576

(51) Int. Cl.
| | | |
|---|---|---|
| *B28B 3/02* | (2006.01) | |
| *G04B 31/012* | (2006.01) | |
| *C04B 35/64* | (2006.01) | |
| *F16C 33/04* | (2006.01) | |
| *G04B 31/06* | (2006.01) | |
| *G04B 31/004* | (2006.01) | |

(52) U.S. Cl.
CPC .............. *G04B 31/012* (2013.01); *C04B 35/64* (2013.01); *F16C 33/043* (2013.01); *G04B 31/004* (2013.01); *G04B 31/06* (2013.01)

(58) Field of Classification Search
CPC .......... B28B 3/02; B28B 3/021; B28B 21/12; B28B 21/10
See application file for complete search history.

(56) References Cited

U.S. PATENT DOCUMENTS

| | | | | |
|---|---|---|---|---|
| 2,201,777 | A | * | 5/1940 | Kliesrath ................. B28B 1/26 249/160 |
| 3,883,314 | A | | 5/1975 | Schnyder et al. |
| 4,204,874 | A | | 5/1980 | Yamada |

FOREIGN PATENT DOCUMENTS

| | | |
|---|---|---|
| CH | 297 479 | 3/1954 |
| CH | 583 441 | 12/1976 |
| FR | 2.130.114 | 11/1972 |
| GB | 2 010 236 A | 6/1979 |

OTHER PUBLICATIONS

CH 583441 (Alwin) Dec. 31, 1976 (English language machine translation). [online] [retrieved May 18, 2015]. Retrieved from: Espacenet.*

European Search Report issued Aug. 29, 2013, in Patent Application No. EP 13 15 8576, filed Mar. 11, 2013 (with English-language translation).

* cited by examiner

*Primary Examiner* — Erin Snelting

(74) *Attorney, Agent, or Firm* — Oblon, McClelland, Maier & Neustadt, L.L.P.

(57) ABSTRACT

The invention relates to a bearing comprising a sintered ceramic body traversed by a hole. According to the invention, the body includes a top surface and a bottom surface each of which includes a functional element communicating with said hole.

12 Claims, 1 Drawing Sheet

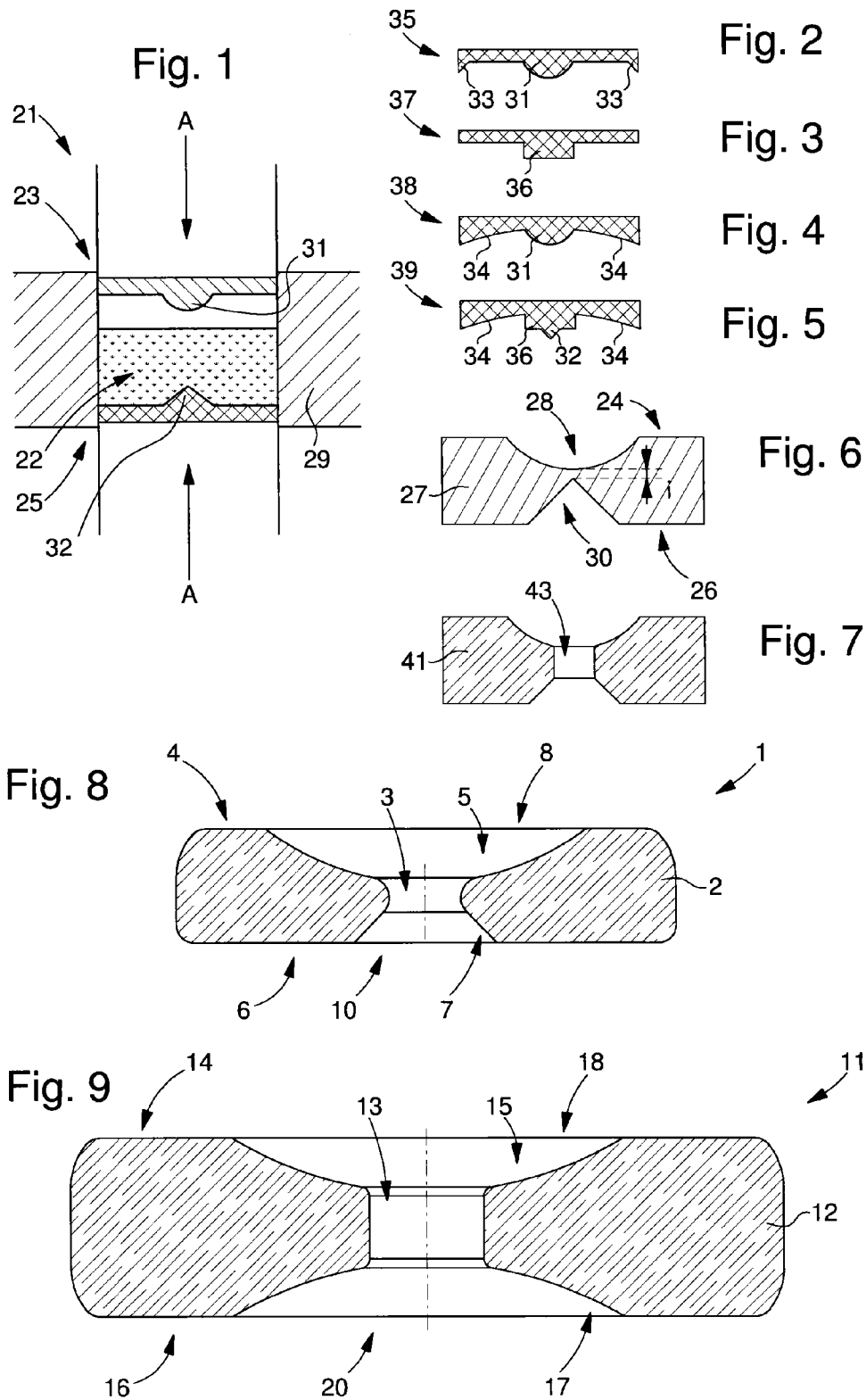

BEARING INCLUDING FIRST AND SECOND FUNCTIONAL ELEMENTS ON TWO DISTINCT FACES

This application claims priority from European patent application No. 13158576.2 filed Mar. 11, 2013, the entire disclosure of which hereby is incorporated by reference.

FIELD OF THE INVENTION

The invention relates to a bearing for a timepiece and in particular, to a bearing of this type comprising first and second functional elements on two distinct faces.

BACKGROUND OF THE INVENTION

It is known to manufacture bearings from single crystal alumina by reducing the volume of a rough blank. However, once a first face is machined to form a first functional element, it becomes very difficult to form a second functional element on another face because of the fragility caused by machining the first face.

Hence, even with a second functional element on another face which is geometrically limited, the scrap rate is too high.

SUMMARY OF THE INVENTION

It is an object of the present invention to overcome all of part of the aforecited drawbacks by proposing a bearing comprising first and second functional elements on two distinct faces which are geometrically extensive and a manufacturing method which drastically reduces the scrap rate.

Therefore, the invention relates to a method of manufacturing a bearing including the following steps:
  a) forming a ceramic precursor from a ceramic based powder in a binding agent;
  b) compressing the ceramic precursor, using a top die and a bottom die, to form a green body of the future bearing having top and bottom surfaces respectively including first and second functional elements leaving a thickness of material between said first and second functional elements;
  c) sintering the green body to form a ceramic body;
  d) forming a through hole in the body to connect said first and second functional elements.

Advantageously according to the invention, each face of the bearing can thus be immediately formed with at least one functional element on each face, even in a very extensive manner, i.e. even with substantially identical areas over each face, without resulting in prohibitive scrap rates.

In accordance with other advantageous features of the invention:
  the maximum section of each of said functional elements is comprised between 1.5 and 5 times that of the hole;
  the ceramic based powder includes at least one metallic oxide, metallic nitride or metallic carbide;
  the ceramic based powder includes aluminium oxide and possibly chromium oxide;
  each die includes at least one stamp intended to form a distinct functional element;
  said at least one stamp includes a spherical and/or a conical and/or parallelepiped surface;
  step b) is achieved by moving the top and bottom dies together inside a case;
  step c) includes a pyrolysis;
  the method includes a final step of finishing the bearing which may include lapping and/or brushing and/or polishing.

Further, the invention relates to a bearing obtained from the method according to any of the preceding variants and including a sintered ceramic body traversed by a hole, characterized in that the body has a top and bottom surface, each of which includes a functional element, communicating with said hole. The maximum section of each functional element may be comprised between 1.5 and 5 times that of the hole.

The bearing may, in particular, be mounted on or form all or part of a plate or a bridge of a timepiece movement.

BRIEF DESCRIPTION OF THE DRAWINGS

Other features and advantages will appear clearly from the following description, given by way of non-limiting illustration, with reference to the annexed drawings, in which:
  FIG. 1 is a schematic diagram of a double effect press according to the invention;
  FIGS. 2 to 5 are variants of dies according to the invention;
  FIGS. 6 to 7 are diagrams of different manufacturing steps for a bearing according to the invention;
  FIGS. 8 and 9 are diagrams of two example bearings according to the invention.

DETAILED DESCRIPTION OF PREFERRED EMBODIMENTS

As explained above, the invention relates to a bearing intended to come into contact with a pivot to render the latter movable in rotation with minimum friction. It is thus clear that the present invention may form all or part of a bearing for a rotatably mounted element.

According to the invention, the bearing is intended to be mounted in a bridge or plate or to form all or part of a plate or bridge of a timepiece movement. However, the invention is in no way limited to the field of horology and may be applied to any element which is moveably mounted relative to a bearing.

Advantageously according to the invention, the bearing includes a sintered ceramic body which is traversed by a hole intended to receive the pivot, also called a trunnion. According to the invention, the body advantageously includes a top surface and a bottom surface, each of which includes at least one functional element communicating with the hole.

FIGS. 8 and 9 show two example bearings 1 and 11 according to the invention. Bearing 1 of FIG. 8 has a generally annular body 2 including a preferably centred hole 3, which opens between a top surface 4 and a bottom surface 6. Advantageously according to the invention, hole 3 communicates with a substantially spherical recess 5 on top surface 4 forming a first functional element 8. In the example visible in FIG. 8, the first functional element 8 flares away from hole 3 to a maximum section substantially 4.5 times wider than that of hole 3. Further, hole 3 also communicates with a substantially conical recess 7 on bottom face 6 forming a second functional element 10. In the example visible in FIG. 8, second functional element 10 flares away from hole 3 to a maximum section substantially 2 times wider than that of hole 3. It is also noted that the wall of body 2 around hole 3 has an olive-cut intended to minimise contact with a pivot but also to facilitate any lubrication.

Bearing 11 of FIG. 9 has a generally annular body 12 including a preferably centred hole 13, which opens between a top surface 14 and a bottom surface 16. Advantageously according to the invention, hole 13 communicates with a substantially spherical recess 15 on top surface 14 forming a first functional element 18. Further, hole 13 also communicates with a substantially spherical recess 17 on bottom face 16 forming a second functional element 20. In the example visible in FIG. 9, the first and second functional elements 18, 20 flare away from hole 13 symmetrically to a maximum section substantially 3.5 times wider than that of hole 13. It is also noted that the wall of body 12 around hole 13 has chamfers intended to prevent contact with a pivot breaking said wall.

With reference to these two examples, it is seen that, advantageously according to the invention, each functional element 8, 10, 18, 20 is independent and can have an equally extensive maximum section on each of faces 4, 6, 14, 16. Of course, as explained below, several identical or non-identical functional elements 8, 10, 18, 20 may also be formed on the same face 4, 6, 14, 16. Likewise, as explained below, each functional element 8, 10, 18, 20 is in no way limited to a substantially spherical or substantially conical recess 5, 7, 15, 17, but may have a different shape or form several combined shapes.

The variety of production of the bearings will become clearer from FIGS. 1 to 7 which show a method of manufacturing a bearing of the invention. The method includes a first step a) intended to form a ceramic precursor from a ceramic based powder in a binding agent.

According to the invention, the ceramic based powder may include at least one metallic oxide, one metallic nitride or one metallic carbide. By way of example, the ceramic based powder may include aluminium oxide to form synthetic sapphire or a mixture of aluminium oxide and chromium oxide to form synthetic ruby. Further, the binding agent may be of various types, such as, for example, a polymer or organic type.

The method includes a second step b) for compressing the ceramic precursor 22 via a top die 23 and a bottom die 25, to form a green body 27 of the future bearing 1 with a top surface 24 and bottom surface 26 respectively including first and second functional elements 28, 30.

As visible in FIG. 1, each die 23, 25 is fixed to one arm of a double effect press 21. According to the invention, one (or both) of dies 23, 25 is moved closer to the other in directions A inside a case 29 to form not only the top and bottom faces 24, 26 but also the external walls.

It is evidently possible for several identical or non-identical green bodies 27 to be formed at the same time in step b). This variant may thus use two plates on which the respective dies 23, 25 are moveably mounted, with the thickness of one of the plates being able to be used to form the case 29 described above for each future green body 27.

It is therefore clear that each green body 27 formed in step b) already includes the blanks 28, 30 of the future first and second functional elements 8, 10. To obtain these blanks 28, 30, each substantially flat die 23, 25 includes at least one stamp 31, 32 intended to form a distinct functional element. FIG. 1 shows that the top die 23 includes a stamp 31 with a substantially spherical surface to form, for example, an oil sink, and the bottom die 25 includes a stamp 32 with a substantially conical surface to form, for example, a clearance cone for mounting the pivot more easily, particularly when the pivot has to be mounted blind in the bearing.

It is thus clear that the large variety of functional elements 8, 10, 18, 20 on each bearing 1, 11 is directly afforded by the shape of the dies without thereby weakening the future bearing. By way of example, other stamp shapes may be envisaged, several stamps may be present on the same die, the actual die may form domed surfaces or the actual stamp may carry a second stamp. Non-limiting variants of dies of the invention are shown in FIGS. 2 to 5 to better demonstrate the variety of bearings obtained according to the invention.

Thus, as visible in FIG. 3, the substantially flat die 37 may include a stamp 36 with a substantially parallelepiped surface. In the example illustrated in FIG. 2, substantially flat die 35 may include a stamp 31 with a substantially spherical surface and a stamp 33 extending annularly in a conical manner to form a chamfer on the external wall of the green body. FIG. 4 shows die 38 including a curve 34, i.e. non-flat, flaring around a stamp 31 with a substantially spherical surface. Finally, in the last proposed variant, as visible in FIG. 5, die 39 including a curve 34, i.e. which is not flat, may also include a first stamp 36 with a substantially parallelepiped surface and a second stamp 32 in the extension of the first with a substantially conical surface.

Preferably according to the invention, a thickness i of material is left between each blank of the first and second functional elements 28, 30 to prevent the deterioration thereof in step c) causing shrinkage. Since the overall thickness of green body 27 is comprised between 250 µm and 1 mm, the thickness i of material is preferably comprised between 10 and 100 µm. It is thus clear that the proportions of any shrinkage are more homogeneous than if the hole between the first and second functional elements 28, 30 is already present prior to sintering.

The method includes a third step c) for sintering green body 27 to form a ceramic body 41. Preferably, according to the invention, step c) includes a pyrolysis. Step c) causes a shrinkage of between 15% and 30% of the volume of green body 27. Finally, the method includes a fourth step d) of forming a through hole 43 in body 41 to connect said first and second functional elements 28, 30. Step d) is preferably achieved using destructive laser radiation to obtain a very precise etch. However, step d) may be obtained using other types of processes such as, for example, mechanical shrinkage such as mechanical drilling or high pressure water etching.

The method may also include a final step of finishing the bearing. This final finishing step may thus include lapping and/or brushing and/or polishing to permit the adjustment of the final dimensions and/or the shrinkage of edges and/or the local modification of roughness.

It is thus clear that it is possible to obtain maximum sections of each functional element 8, 18, 10, 20 which can be substantially identical (FIG. 9) or not (FIG. 7, 8), constant (stamp 36) or not (stamp 31, 32) and which are preferably comprised between 1.5 and 5 times the section of hole 3, 13, without rendering the method more difficult to implement or resulting in a less favourable scrap rate. Indeed, bevels or olive-cut of a bearing hole, which offer a maximum section greater than 1 times the section of the hole should not be interpreted as a functional element within the meaning of the invention.

Of course, this invention is not limited to the illustrated example but is capable of various variants and alterations that will appear to those skilled in the art. In particular, other types of functional elements formed by other stamp and/or die geometries may be advantageously envisaged according to the invention.

What is claimed is:

1. A method of manufacturing a bearing comprising:
   forming a ceramic precursor from a ceramic based powder in a binding agent;
   compressing the ceramic precursor, using a first die and a second die, to form a green body of a blank of the bearing including a first surface and a second, opposite surface respectively including a first recess and a second recess, and leaving a thickness of material between the first recess and the second recess;

sintering the green body to form the blank of the bearing with the thickness of material between the first recess and the second recess; and forming a through hole through the thickness of material in the blank to connect the first recess and the second recess so as to form the bearing, wherein a maximum section of each of the first and second recesses is comprised between 1.5 and 5 times a section of the hole.

2. The method according to claim 1, wherein the ceramic based powder includes at least one metallic oxide, one metallic nitride or one metallic carbide.

3. The method according to claim 2, wherein the ceramic based powder includes aluminium oxide.

4. The method according to claim 3, wherein the ceramic based powder further includes chromium oxide.

5. The method according to claim 1, wherein each of the first and second dies includes at least one stamp intended to form a distinct recess.

6. The method according to claim 5, wherein the at least one stamp includes a spherical surface.

7. The method according to claim 5, wherein the at least one stamp includes a conical surface.

8. The method according to claim 5, wherein the at least one stamp includes a parallelepiped surface.

9. The method according to claim 1, wherein the compressing includes moving together the first die and the second die together inside a case.

10. The method according to claim 1, wherein the sintering includes a pyrolysis.

11. The method according to claim 1, further comprising finishing the bearing.

12. The method according to claim 11, wherein the finishing includes at least one of lapping, brushing, and polishing.

* * * * *